Aug. 11, 1942.   B. C. BRADNER ET AL   2,293,013
MEANS FOR MAKING SYMMETRIZED MOLDING
Filed May 7, 1941   2 Sheets-Sheet 1
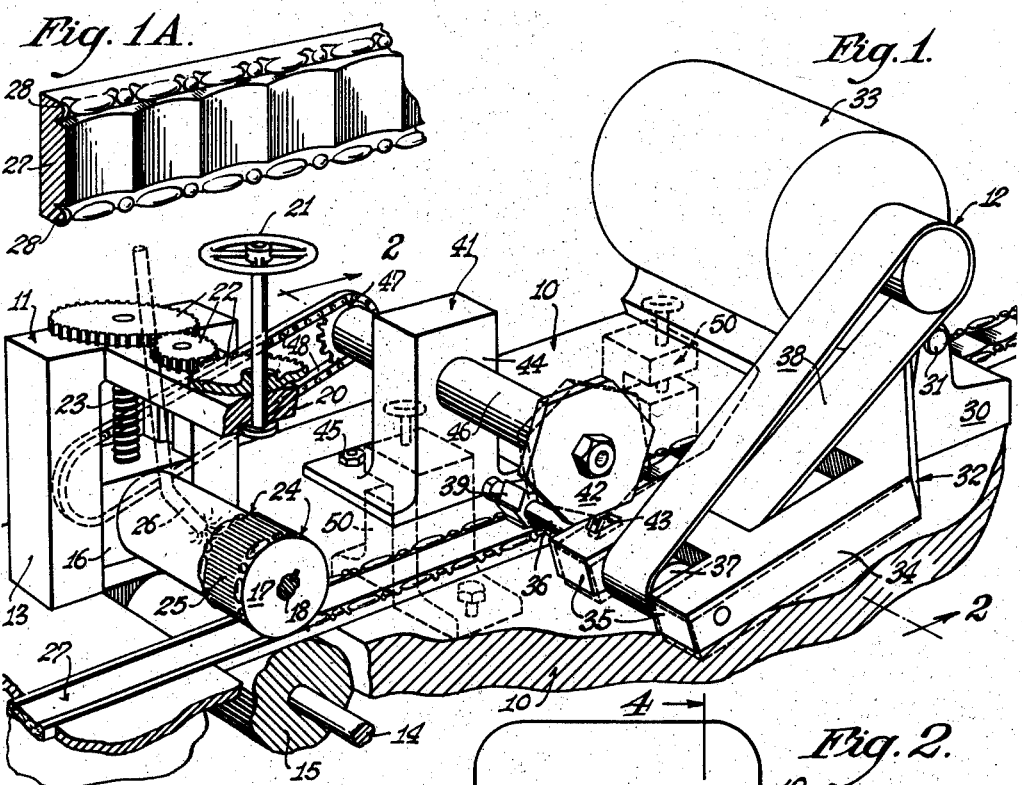
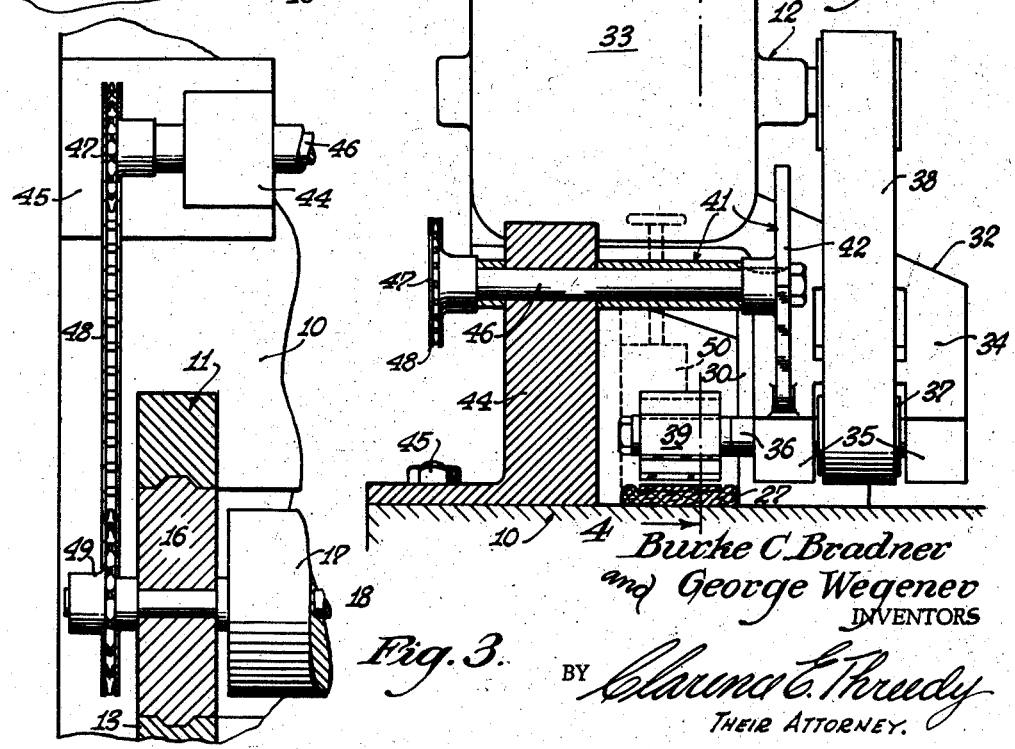
Burke C. Bradner
and George Wegener
INVENTORS
BY Clarence E. Threedy
THEIR ATTORNEY.

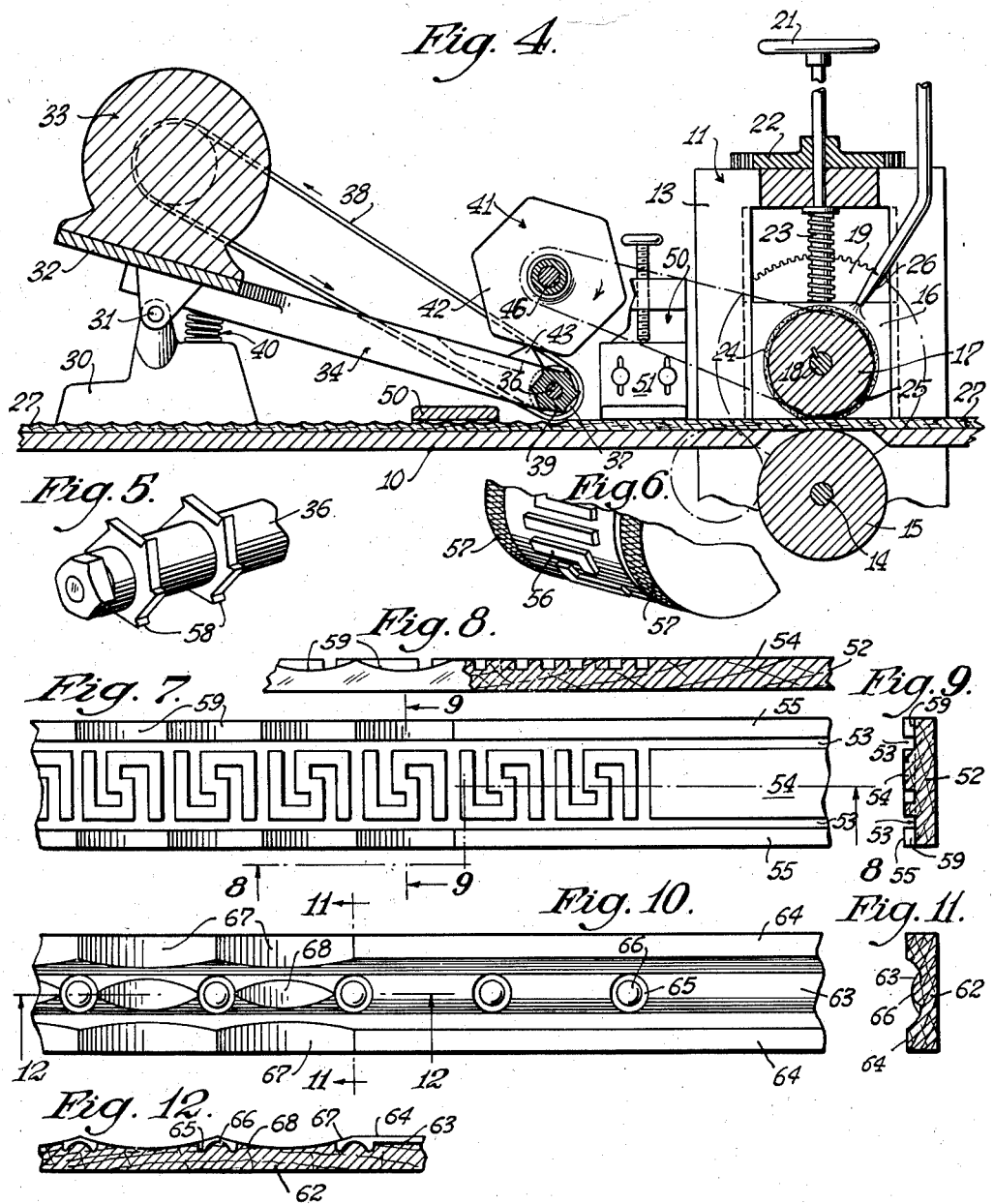

Patented Aug. 11, 1942

2,293,013

UNITED STATES PATENT OFFICE 2,293,013

MEANS FOR MAKING SYMMETRIZED MOLDING

Burke C. Bradner and George Wegener, Chicago, Ill., assignors to Boynton & Company, Chicago, Ill., a corporation of Illinois Application May 7, 1941, Serial No. 392,330

5 Claims. (Cl. 144—137)

This invention relates to the art of woodworking and has for its principal object the provision of a means for making ornamental molding strips by a simple operation resulting in great economy in the production of such molding strips.

Another object of this invention is to provide in machines for making ornamental moldings, a means for synchronizing the steps required so as to produce a symmetrized ornamentation on the molding strip.

A further object of this invention is to provide in a machine wherein there is employed a plurality of steps in producing a finished product, a novel arrangement of parts adapted to function coordinately to produce a predetermined facial impression upon molding strips.

A still further object of this invention is to provide in a device employing embossing and cutting means, a synchronized relationship between such embossing and cutting operations whereby to effect a symmetrical design upon the face of molding strips passed through such machine.

Other objects and advantages will appear more fully as the invention is described in view of the drawings, in which:

Fig. 1 is a fragmentary perspective view of a woodworking machine embodying our invention;

Fig. 1A is a perspective view of the finished product made in the machine illustrated in Fig. 1;

Fig. 2 is a vertical cross sectional detail taken substantially along line 2—2 in Fig. 1;

Fig. 3 is a fragmentary horizontal sectional plan view through a cammed driving link embodied in our invention;

Fig. 4 is a vertical longitudinal sectional detail of the machine shown in Fig. 1, as seen substantially along line 4—4 in Fig. 2;

Fig. 5 illustrates an alternate type of cutting tool which may be used;

Fig. 6 is a fragmentary illustration of an embossing die employed in producing a molding strip such as is illustrated in Figs. 7 to 9 inclusive;

Figs. 10 to 12 inclusive illustrate another form of molding produced by the teachings of our invention.

In the manufacture of molding strips, various ornamental designs are cut or otherwise formed into a face of wooden strips for the purpose of producing pleasing configurations. It is common practice to produce such designs in a number or series of sequential steps, each of which requires a separate operation as well as a separate machine for the accomplishment of the particular step involved.

The present invention contemplates the embodiment of several of such steps in a single unitary machine wherein once the machine has been set for operation the raw material may be inserted and automatically moved through the machine to receive an embossing impression as well as a cutting operation so timed with respect to the embossed pattern as to effect a novel design on the finished product which ultimately emerges from the machine.

In the present disclosure there is employed a bed plate 10 having arranged thereon an embossing device 11 and a milling or cutting device 12. The embossing device comprises a frame 13 having a fixed shaft 14 arranged to traverse the bed plate 10 and adapted to support a roller member 15 for floating action. The circumference of the roller 15 is arranged tangentially with respect to the top surface of the bed plate 10, so that wood stock passing along the top surfaces of the plate 10 will bearingly engage the roller 15. The frame 11 has arranged thereon a pair of vertically adjustable bearing blocks 16 which form a carriage for a feeding roller 17, such roller 17 being keyed to a shaft 18 rotatably mounted in the blocks 16 and carrying at one end thereof (Fig. 4) a gear member 19 adapted to be drivingly engaged with any suitable form of power take-off unit (not shown).

The frame of the embossing device 11 includes a bridge portion 20 wherein there is mounted for rotatable movement an adjustable handle 21 which operates through a train of gears 22 to rotate a pair of screws 23, there being one at each end of the roller 17, and having threaded connection with the vertically adjustable blocks 16 adjacent thereto. The arrangement is such that rotation of the hand control increases or decreases the pressure of the roller 17 upon the material passing therebeneath.

The roller 18 is adapted to have arranged thereon embossing dies 24, and in the illustration of Fig. 1 there are two such embossing dies spaced from one another by an intermediate portion 25 having a knurled surface which grippingly engages the top surface of the stock passing through the rollers 15 and 17 to cause the stock to progress through the machine by a uniform and positive movement. The machine is provided with a heating element 26 in the form of a gas line, the jet of which is positioned with respect to the dies 24 to bring the dies up to a predetermined temperature for the embossing operation.

The stock heretofore referred to comprises a strip of wood 27 which may be planed and milled to correspond to the particular design desired. In the present instance, the strip 27 has a beaded edge 28 (Fig. 1A) and a flat central portion adapted to be engaged by the knurled surface of the spacer roller 25. As the strip 27 is moved through the embossing unit, the configurations in the dies 24 are, by reason of the heat and extreme pressure, embossed into the beaded edges 28 so as to produce a dot and oval pattern along the beaded edges, the strip 27 moving along the top surface of the bed plate 10 in accordance with the speed of the embossing roller 17, there being a predetermined number of dot and oval die formations in the die elements 24 so that there will result a predetermined number of units (i. e. the distance between two dot formations).

The cutting unit 12 comprises an arbor 30, adjustably fixed to the bed plate 10, and upon which arbor is pivotally arranged as at 31 a rocking carriage 32. This rocking carriage supports a driving element in the form of an electric motor 33, and has a radially extending portion 34 which provides at its end portion a trunnion 35 within which is arranged for rotation a cutter shaft 36 having a pulley 37 drivingly connected by belt means 38 to the electric motor 33. A cutter 39 is adapted to be arranged on the shaft 36 so that the cutter 39 is positioned directly above the medial portion of the stock 27 passing along the bed plate 10.

As is shown in Fig. 5, the cutter may be any one of a number of well known forms determined by the particular pattern or design desired upon the molding strip being cut. The cutting unit 12 employs a spring element 40 disposed between a portion of the arbor 30 and the radially extending arm 34 of the rockable support 32, so as to rotate the latter counterclockwise (Fig. 4) about the pivotal mounting 31 to urge the cutting tool 39 in a direction away from the stock 27. Such counterclockwise movement is limited by cam means generally indicated at 41 and comprising a disc 42, the peripheral edge of which is adapted to be engaged by a bearing lug 43 formed on one leg of the trunnion 35.

The cam means 41 includes a supporting standard 44 adapted to be adjustably mounted as at 45 on the bed plate 10. This standard rotatably supports a shaft 46 which carries at one end thereof the cam disc 42 and at the opposite end thereof a sprocket 47, which is drivingly connected by a chain 48 to a sprocket 49 fixedly mounted at one end of the embossing roller shaft 18.

In the present disclosure the camming disc 42 is of a hexagonal form, the driving ratio between the sprockets 47 and 49 being such that the shaft 46 will be rotated a circumferential distance equal to one-sixth of 360 degrees during the time of travel of a length of the stock between two of the dot formations, or the length of one unit as heretofore explained. The machine being timed as just explained and the standard 44 being spaced from the embossing device 11 in a predetermined position, the embossed stock will pass beneath the cutter 39 and at the moment one unit (the length of stock between two dot formations) is centered with respect to the long axis of the cutter shaft 36, the camming disc will have rotated with one of its high points in engagement with the bearing lug 43 on the rockable support 32 to urge the latter against the action of the spring 40 clockwise (Fig. 4), whereby the cutter 39 will mill out a portion of the upper surface of the stock 27, the disc 42 continuing its rotative movement so as to release bearing action on the rockable carriage 32, allowing the latter to be swung away from the stock 27 by the spring 40. This reciprocation or oscillation of the carriage 32 is synchronized with the rotative action of the embossing roller 17 such that one cutting operation is performed upon each unit of stock 27 as embossed by the die 24 on the embossing roller.

It will be noted that the stock 27 progresses through the machine in a uniform and gradual movement in accordance with the speed of the embossing roller 17. By reason of this constant movement of the stock 27, the cutting operation takes place during such movement, and it is particularly to be noted that the cutting operation is momentary, with the grain of the wood being cut, and by a cutter rotating at a speed sufficient to leave a clean and uniform cut surface on the stock. The speed of the cutter 39 is governed by the motor means 33 which operates independently of the driving element for the embossing unit 11, it being particularly pointed out that the cutting operation is controlled through the driving means to the embossing unit 11 by virtue of the cam means 41 drivingly connected thereto.

Heretofore in cutting molding strips, it has been a practice to cut across the grain of the material. Such a cutting operation would not be practical where the stock is continuously moving through the machine, and therein lies one of the particular advantages of our disclosure which employs a cutting means having an action on the stock in the direction of its graining so that there will be no unnecessary burrs or splintering of the surface being acted upon, with the result that the finished product needs no further dressing or other treatment prior to its issuance to the trade.

In the present arrangement the stock is adapted to pass beneath certain guiding blocks indicated at 50. These blocks 50 are fixed to the bed plate 10 into the desired relationship with respect to the stock 27 and have a vertically adjustable portion 51 arranged to be screwed down over the stock in such manner as to prevent vibration of the latter when the milling or cutting operation takes place (see Fig. 4).

As is shown in Fig. 1, the molding strip produced on the machine embodying the dies 24 and the cutter 39, has a symmetrical pattern in which there are concave or scalloped formations for each unitary embossed pattern along the beaded edges 28.

As will be seen in Figs. 7 to 9 inclusive, the stock 52 may be originally grooved as at 53 to provide a medial face 54 with bordering faces 55 adjacent the top and bottom edges. The embossing die 56, as illustrated in Fig. 6, will be arranged on the roller shaft 18, there being a pair of knurled surfaced rollers 57 arranged at the sides of the die 56 in such manner that the medial face 54 of the strip 52 will be embossed by the die 56 and the knurled rollers 57 will bear upon the bordering edges 55 to train the stock 52 through the machine in accordance with the speed of the roller 17. The cutter shaft 36 may have arranged thereon a pair of cutting knives 58, each of which is arranged above the stock so that they are in vertical alignment with the respective bordering surfaces 55. As will be noted at the left-hand of Fig. 7, the bordering surface will be milled out as at 59 by the cutting tools, and each milling operation will take place when one unit or one particular pattern is in alignment with the cutting tools 58.

It is obvious that many different patterns and designs may be formed in the face of molding strips in accordance with the teachings of our present invention. Another pleasing effect may be had as illustrated in Figs. 10 to 12 inclusive by employing a wood strip 62 having its face portion milled out to provide a central bead 63 and a pair of bordering edges 64. The stock 62 is fed into the embossing unit, and this embossing unit will employ knurled rollers similar to the rollers 57 illustrated in Fig. 6, which will bear against the surfaces 64 to feed the stock through the machine. The embossing die will emboss a single impression in the form of a ring 65 upon the bear 63, resulting in dot formations 66 spaced uniformly from each other along the bead 63. By reason of the timed relationship between the embossing operation and the cutting operation, a cutting tool similar to that illustrated in Fig. 1 will be caused to bear down upon the top surface of the stock 62 to mill out the bordering edges 64 as at 67 and, in addition thereto, milling out a portion of the bead 63 as at 68, between two of the dot formations 66, resulting in a symmetrical design composed of embossed and cut formations on the milling strip 62.

While we have disclosed one particular way in which our invention may be carried into effect, it is obvious that various adaptations may be employed to bring about the desired results. It is particularly pointed out that an interrelationship between the cutting operation and the embossing operation is brought about by a connecting link through the driving connection of the embossing mechanism, whereby the oscillating cutter unit is affected in unison with the progressive movement of a molding strip through the machine, the relationship of the embossed pattern being synchronized with the cutting operation so as to produce a combined effect of cutting and embossing upon molding strips, where the two are symmetrized to produce a pleasing and novel ornamentation.

We do not wish to be limited to the precise details of construction set forth, but desire to avail ourselves of such variations and modifications as come within the scope of the claims.

Having thus described our invention, what we claim as new and desire to protect by Letters Patent is:

1. In a device for making ornamentation on molding strips the provision of a bed plate, an embossing press on said plate and including a rotatable embossing roller, drive means for said roller, a cutter, frame means for mounting the latter on said bed plate for oscillation with respect thereto, cam means and means for mounting the same on said bed plate relative to said embossing press and the cutter, said cam means having bearing engagement with said frame means, a spring arranged between said bed plate and said frame means to urge the latter toward said cam, and means for drivingly connecting said cam means and the embossing roller for effecting movement of said cam in accordance with the rotation of said embossing roller.

2. In a device for making symmetrized ornamentation on molding strips, the provision of a table over which such strips may be moved, an embossing press having a driven roller, means on said roller adapted to engage a strip disposed on the table and to move the strip therealong at a predetermined speed, an embossing die on said roller, said die comprising a plurality of individual patterns of uniform character, a rotary cutter and drive means therefor, means for mounting said cutter and drive means for oscillatory movement with respect to the path of movement of said strip on the table, means for synchronizing the oscillation of said cutter with respect to the movement of said embossing die, said means comprising a rotatable cam, means for mounting said cam for rotation above the table, said cam arranged to bearingly engage said cutter mounting means, resilient means for urging said cutter mounting means toward said cam, and a driving connection between said rotatable cam and said embossing roller whereby to urge said cutter against the strip as an individual embossed pattern aligns with said cutter.

3. In a pattern forming device for ornamental strips including a bed, an embossing roller in the bed and means for driving said roller, the provision of a die on said roller, said die having a series of unitary patterns thereon, said embossing roller arranged to engage materal disposed on said bed to impress said pattern in said material and to urge the latter in one direction, an oscillating cutter, means for mounting the latter for oscillation with respect to said material, spring means arranged to urge said cutter mounting in one direction, cam means arranged above the bed for rotative movement and to operatively engage said cutter mounting to urge the latter in an opposite direction, and drive means linking said cam and the embossing roller whereby to move said cutter mounting once as each unitary pattern on the material is aligned with the cutter.

4. In a device for forming symmetrized ornamentation in molding strips including an embossing roller and a rotary cutter each mounted on a table over which such strip is adapted to be moved, said embossing roller arranged to engage said strip and to move the latter along said table, said rotary cutter being arranged to rotate in the direction of movement of said strip, means normally urging said cutter away from said strip, and means for urging the latter toward said strip at intervals, said last named means having driving connection with said embossing roller and adapted to move in unison therewith.

5. In a device of the class described including a bed plate together with a driven embossing roller and a rotary cutter each arranged on said bed plate, the combination of die means on said roller and having a plurality of unitary patterns arranged equidistant along the circumference of said roller, said roller adapted to feed a molding strip along said bed plate at a predetermined speed, means for mounting said rotary cutter for oscillating movement with respect to said moving strip, said means including a spring for normally urging the cutter mounting means away from the strip and a cam device engageable with said mounting means for urging said rotary cutter into cutting engagement with said strip, and mechanism connecting said cam device and said embossing roller whereby to cause operation of said cam device as aforesaid, each time said strip travels a distance equal to the length of one of said unitary patterns on said die.

BURKE C. BRADNER.
GEORGE WEGENER.